United States Patent
Colling

(10) Patent No.: US 7,233,777 B2
(45) Date of Patent: Jun. 19, 2007

(54) SEPARATION OF AM COCHANNEL SIGNALS IN AN OVERLOADED SIGNAL ENVIRONMENT

(75) Inventor: James F. Colling, Rowlett, TX (US)

(73) Assignee: L-3 Integrated Systems Company, Greenville, TX (US)

( * ) Notice: Subject to any disclaimer, the term of this patent is extended or adjusted under 35 U.S.C. 154(b) by 344 days.

(21) Appl. No.: 10/930,732

(22) Filed: Aug. 31, 2004

(65) Prior Publication Data

US 2006/0046670 A1  Mar. 2, 2006

(51) Int. Cl.
*H03C 1/52* (2006.01)
*H04B 1/02* (2006.01)

(52) U.S. Cl. .................................... 455/108; 455/188.1

(58) Field of Classification Search ............... 455/3.01, 455/3.02, 37, 59, 60, 103, 105, 108, 334, 455/179.1, 188.1
See application file for complete search history.

(56) References Cited

U.S. PATENT DOCUMENTS

| | | | |
|---|---|---|---|
| 5,307,517 A | 4/1994 | Rich | |
| 5,588,022 A * | 12/1996 | Dapper et al. | 375/216 |
| 5,697,086 A | 12/1997 | Svoboda | |
| 5,943,345 A * | 8/1999 | Takegahara | 370/480 |
| 5,995,567 A | 11/1999 | Cioffi et al. | |
| 6,005,894 A * | 12/1999 | Kumar | 375/270 |
| 6,018,317 A | 1/2000 | Dogan et al. | |
| 6,208,295 B1 | 3/2001 | Dogan et al. | |
| 6,215,983 B1 | 4/2001 | Dogan et al. | |
| 6,310,704 B1 | 10/2001 | Dogan et al. | |
| 6,452,977 B1 * | 9/2002 | Goldston et al. | 375/260 |
| 6,535,666 B1 | 3/2003 | Dogan et al. | |
| 6,574,235 B1 | 6/2003 | Arlan et al. | |
| 6,658,234 B1 | 12/2003 | Dogan et al. | |
| 6,847,688 B1 | 1/2005 | Molnar et al. | |
| 2006/0223479 A1 | 10/2006 | Stanners | |

FOREIGN PATENT DOCUMENTS

EP  1032962 B1  6/2003
WO  WO99/33141  7/1999

OTHER PUBLICATIONS

Trussell, "The Feasible Solution In Signal Restoration", IEEE Transactions On Acoustics, Speech, And Signal Processing, vol. ASSP-32, No. 2, Apr. 1984, pp. 201-212.
Search Report, PCT/US05/30515; Oct. 31, 2006; 3 pgs.
Ampsys, "Platinum II FM Demodulator", Printed From Internet Aug. 2004, 2 pgs.
Ampsys, "Platinum III FM Demodulator", Printed From Internet Aug. 2004, 2 pgs.
Ampsys, "Platinum II & III FM Demodulator", Printed From Internet Aug. 13, 2004, www.ampsys-eletronics.com/products/indexoffers.php, 1 pg.

(Continued)

*Primary Examiner*—Nguyen T. Vo
(74) *Attorney, Agent, or Firm*—O'Keefe, Egan, Peterman, Enders LLP

(57) ABSTRACT

Multiple cochannel AM signals received in an overloaded signal environment may be separated using RF data through a method of iterative projections.

33 Claims, 7 Drawing Sheets

OTHER PUBLICATIONS

Ampsys, "FM Modulation", Printed From Internet Aug. 13, 2004, www.ampsys-electronics.com/technology/indexfmdemodulation.php, 2 pgs.

Ampsys, "Technology Pack", Printed From Internet Aug. 16, 2004, www.ampsys-electronics.com/tech-transfer/indexopportunities.php, 1 pg.

Ampsys, "FM Multipath Interference", Printed From Internet Aug. 13, 2004, www.ampsys-electronics.com/technology/indexmultipath.php, 1 pg.

Ampsys, "FM Co-Channel Interference", Printed From Internet Aug. 13, 2004, www.ampsys-electronics.com/technology/indexcochannel, 1 pg.

Ampsys, "Standard FM Demodulators", Printed From Internet Aug. 13, 2004, www.ampsys-electronics.com/technology/indexstandard, 1 pg.

Ampsys, "Platinum FM Demodulator", Printed From Internet Aug. 13, 2004, www.ampsys-electronics.com/technology/indexplatinum.php, 2 pgs.

Ampsys, "Platinum II & III FM Technology Pack", Printed From Internet Aug. 13, 2004, www.ampsys-electronics.com, 1 pg.

Ampsys, "The Platinum III FM Technology Pack", Printed From Internet Aug. 13, 2004, www.ampsys-elecctronics.com/products/platinum-III.php, 3 pgs.

Ampsys, "The Platinum III FM Demodulator Evaluation Unit", Printed From Internet Aug. 13, 2004, www.ampsys-elecctronics.com/products/platinum-III-features.php, 1 pg.

Ampsys, "Technology Pack", Printed From Internet Aug. 13, 2004, www.ampsys-electronics.com/indexhome.php, 1 pg.

Ampsys, "Company Background", Printed From Internet Aug. 13, 2004, www.ampsys-electronics.com/home/indexabout.php, 1 pg.

Ampsys, "The Platinum II FM Technology Pack", Printed From Internet Aug. 13, 2004, www.ampsys-elecctronics.com/products/platinum-II.php, 2 pgs.

Ampsys, "Team" Printed From Internet Aug. 16, 2004, www.ampsys-electronics.com/home/indexteam.php, 1 pg.

Ampsys, "The Platinum II FM Demodulator Evaluation Unit", Printed From Internet Aug. 13, 2004, www.ampsys-eletonics.com/products/platinum-II-features.php, 1 pg.

Widrow et al., "Adaptive Noise Cancelling: Principles And Applications", Proceedings of The IEEE, vol. 63, No. 12, Dec. 1975, pp. 1692-1716.

Verdu, "Multiuser Detectors", Chapter 7, Cambridge University Press, New York, 1998, pp. 344-363.

* cited by examiner

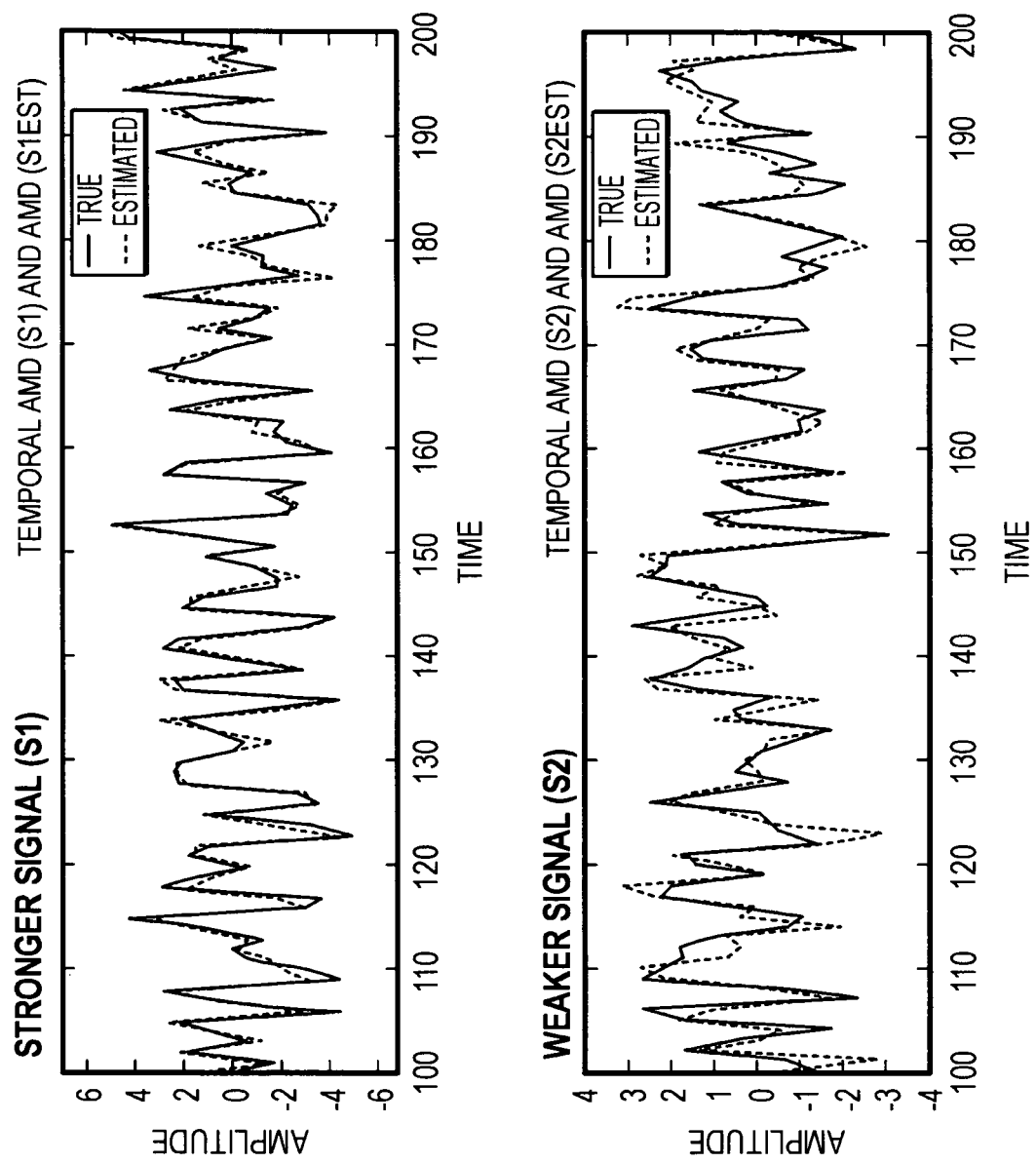
FIG. 5 - TRUE INITIAL PHASES

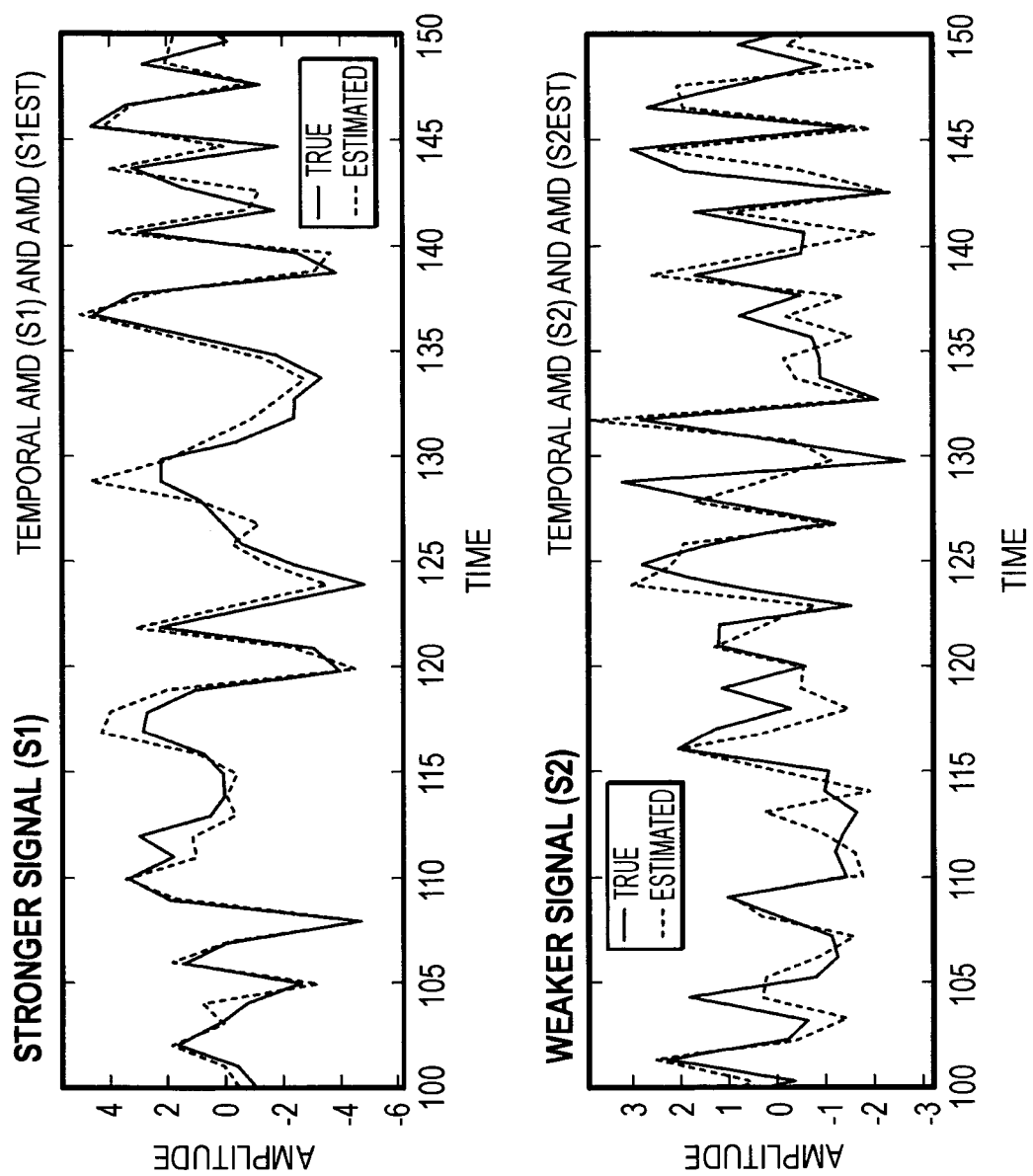
FIG. 6 - RANDOM INITIAL PHASES

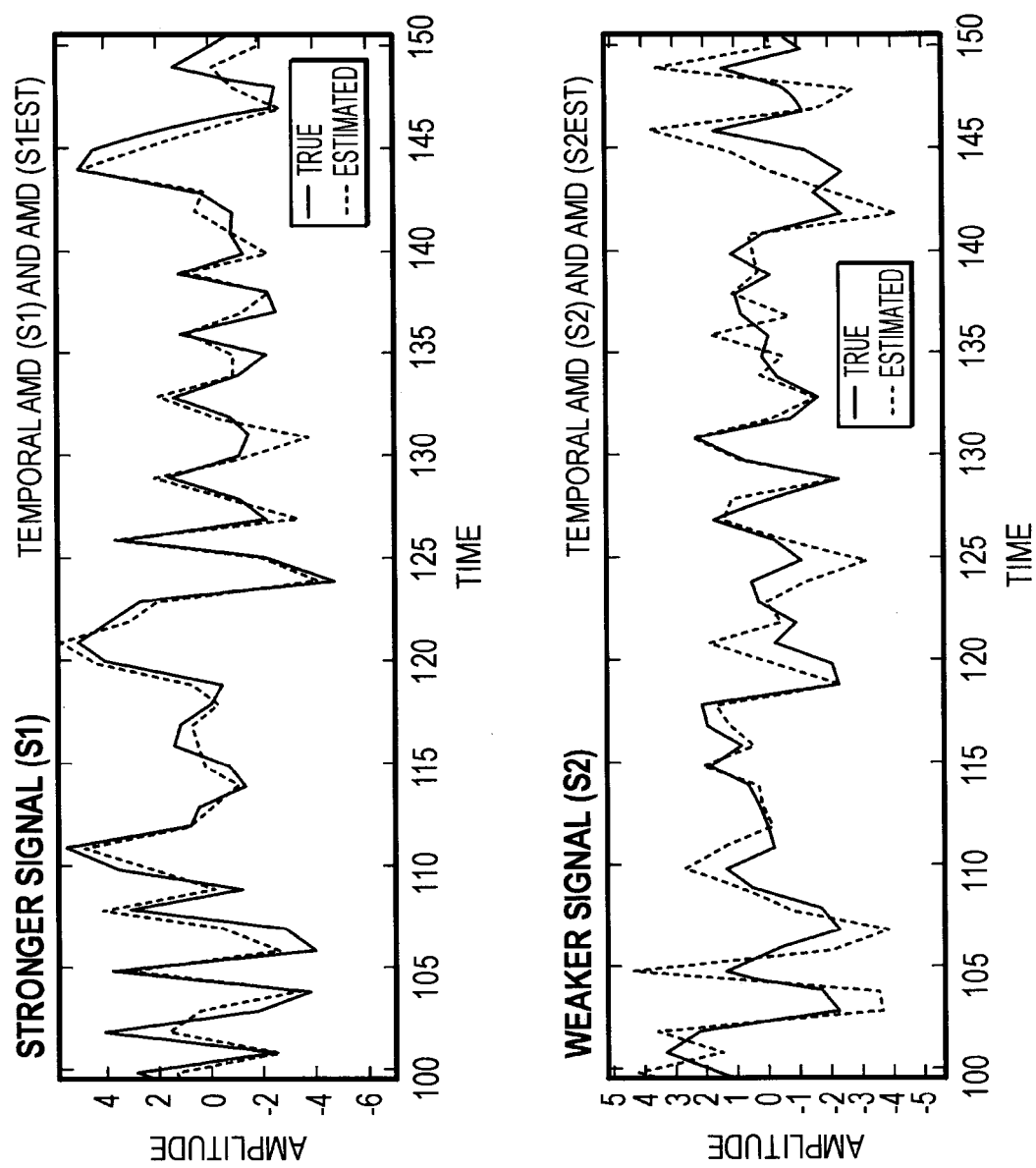
FIG. 7 - INCORRECT INITIAL PHASES

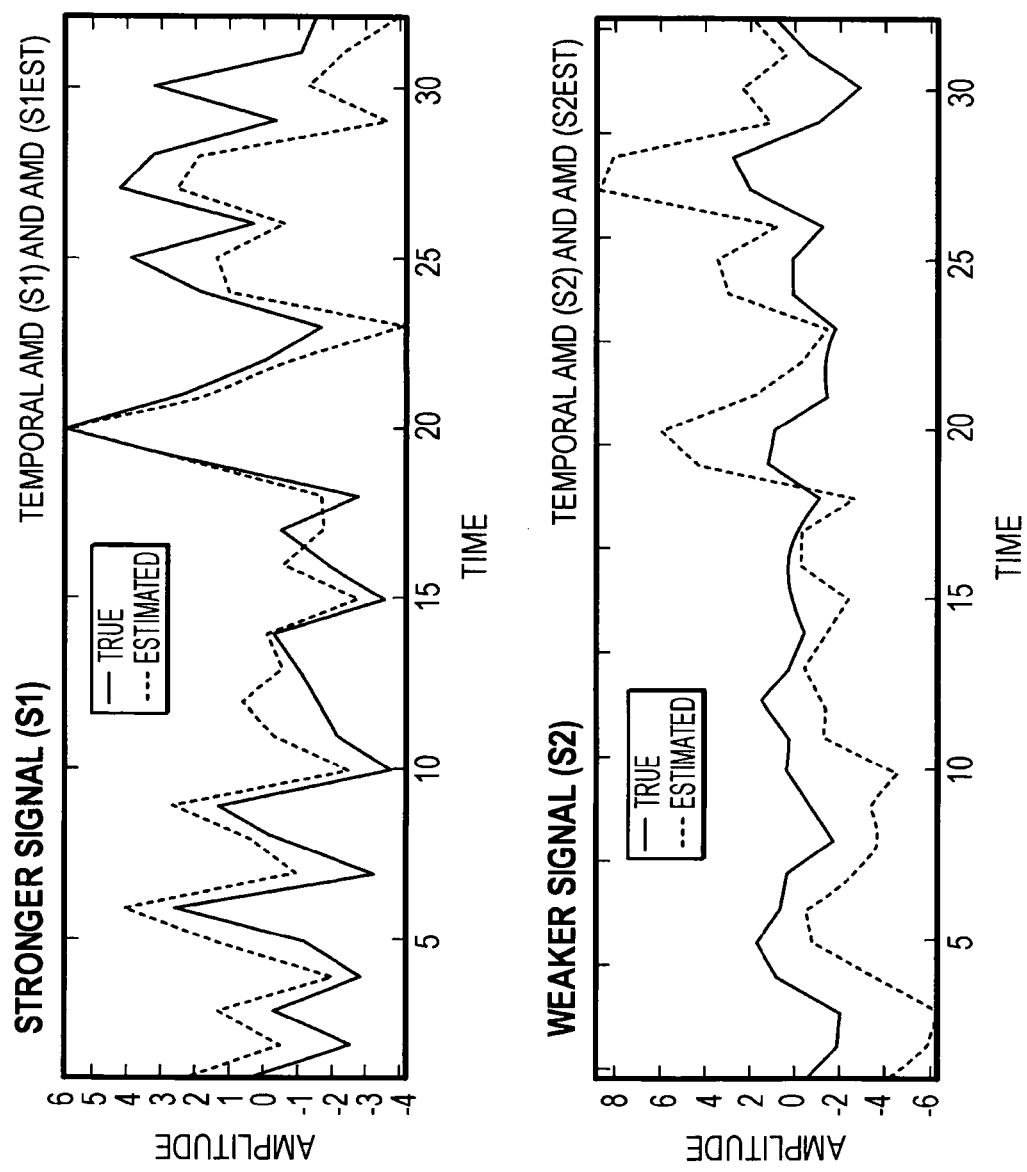
FIG. 8 - DOPPLER ON STRONG SIGNAL

SEPARATION OF AM COCHANNEL SIGNALS IN AN OVERLOADED SIGNAL ENVIRONMENT

BACKGROUND OF THE INVENTION

1. Field of the Invention

This invention relates generally to radio frequency (RF) signal reception, and more particularly to reception and separation of cochannel amplitude modulated (AM) signals.

2. Description of the Related Art

Cochannel signal interference occurs when two or more signals are transmitted at the same time over the same frequency range. For example, cochannel signal interference may be encountered by a receiver that is receiving two or more signals transmitted at the same frequency and at the same time by two or more separate transmitters. In such a case, data (e.g., voice data, text data, etc.) contained in any one of the interfering cochannel signals cannot be accessed or processed further without first separating the given signal from the other signals to allow demodulation or other further signal processing.

In the past, beamforming and interference cancellation techniques such as spatial interference cancellation have been employed for purposes of cochannel signal separation. These techniques employ multiple sensors to separate a given signal of interest by canceling or nulling out other cochannel signals from the signal of interest. However, such approaches require spatial separation of sources in addition to expensive coherent multi-channel tuners having a number of channels corresponding to a number of sensors that is equal to or greater than the number of cochannel signals. When the number of signals exceeds the number of sensors, the signal environment may be characterized as overloaded. Performance of traditional beamforming and interference cancellation techniques typically fails or degrades in such an overloaded signal environment.

SUMMARY OF THE INVENTION

Disclosed herein are methods and systems that may be implemented to separate cochannel AM signals in an overloaded signal environment, i.e., a signal environment where the number of cochannel signals exceeds a number of separate sensors (e.g., separate antennas). Advantageously, the disclosed methods and systems may be implemented in one exemplary embodiment to achieve separation of cochannel AM signals in an overloaded environment using data obtained from one sensor through a method of iterative projections. When implemented to use data obtained from a single channel tuner, for example, the iterative methodology of the disclosed methods and systems eliminates the need for multi-channel coherent hardware and the constraint of spatially separated multiple sources.

In one embodiment, the disclosed methods and systems may be implemented to improve reliability and performance of an AM receiver system by enabling cochannel signal separation even when the number of AM cochannel signals exceeds the number of sensors or antenna elements. In another embodiment, the disclosed methods and systems may be implemented to reduce the cost, complexity and/or size of an AM receiver system by reducing the number of sensors and corresponding separate tuner channels that are required to separate cochannel AM signals. In yet another embodiment, the disclosed methods and systems may be implemented to allow more efficient use of the AM frequency band by allowing selection and separation of one or more target AM signals from a number of cochannel AM signals that are intentionally transmitted on the same frequency, and potentially allowing simplification or elimination of the government approval process for establishing new AM broadcast channels.

As an example, in one exemplary embodiment, the disclosed methods and systems may be implemented as a receiver system that is capable of separating or isolating at least one AM signal from two or more transmitted cochannel AM signals using a single sensor (e.g., single antenna) coupled to a corresponding single channel tuner. Such a single-sensor implementation may be utilized to achieve cost savings and reduced receiver system size, facilitating installation of such a receiver system on mobile platforms (e.g., ships, aircraft, automobiles, trains, unmanned aerial vehicles, model aircraft, etc.), where implementation of larger and more costly multi-sensor antenna receiver systems are impractical or impossible.

The disclosed methods and systems may be advantageously implemented in one embodiment to selectively isolate (e.g., for purpose of listening, further processing, etc.) one or more desired cochannel AM signals from the cochannel AM signals that have been separated from an overloaded signal environment that is unintentionally or undesirably created, e.g., such as when a permanent or mobile receiver is geographically positioned between two transmitters that are transmitting AM signals over the same frequency at the same time. One example of such a situation is vehicle-based receiver that is located between two cities having transmitters that are simultaneously broadcasting AM signals at the same frequency.

However the disclosed methods and systems may also be implemented in another embodiment to enable selective isolation of one or more AM signals that have been separated from an intentionally or deliberately created overloaded signal environment. In this regard, two or more AM signals may be intentionally transmitted at the same time over the same selected frequency range in manner to more efficiently utilize the selected frequency range. In such an embodiment, the cochannel AM signals may originate or be transmitted in any manner suitable for creating an overloaded signal environment from which the AM cochannel signals may be separated and at least one of the AM cochannel signals may be isolated using the disclosed methods and systems. For example, the cochannel AM signals may originate or be transmitted from geographically remote locations (e.g., by transmitters and antennas located in separate adjacent cities, by transmitters and antennas located in different geographical areas of the same city, etc.), and/or the cochannel AM signals may originate or be transmitted from a common geographic location (e.g., by transmitters and antennas located at the same radio station or other facility).

In one exemplary embodiment, multiple commercial AM radio signals may be intentionally transmitted over the same selected frequency range. In another exemplary embodiment, AM radio signals that contain public service information (e.g., weather-related information, highway-related information, emergency broadcast system "EBS" information, etc.) may be intentionally broadcast either continuously or on an as-needed basis over the same selected frequency range used by, or that may be used by, other transmitter/s of AM signals (e.g., commercial AM radio transmitters). For example, the disclosed methods and systems may be implemented to allow intermittent public service broadcasts (e.g., upon occurrence of a catastrophic event such as plane crash, earthquake, tornado, hurricane, etc.) to be transmitted over one or more AM frequencies (e.g., over a selected number of multiple AM frequencies) that may be shared by local commercial AM radio stations. In such an embodiment, a receiver may be configured according to the disclosed methods and systems to isolate the public service broadcast from other cochannel AM signals.

Whether an overloaded signal environment is intentional or not, the disclosed methods and systems may be implemented in one embodiment in specialized public service radios that are designed to isolate a public service AM broadcast signal from an overloaded signal environment if it should happen to exist at time of the public service transmission (e.g., to help ensure that the public service transmission is received even under adverse cochannel signal conditions). In another embodiment the disclosed methods and systems may be implemented as part of a commercial AM radio receiver that is configured to receive commercial radio broadcasts under normal operating conditions, but that is also configured to isolate and identify intermittent public service broadcast signals when they occur in an overloaded signal environment. Such a receiver may be optionally configured to preferentially play the public service broadcast to a listener. In any case, a signal environment may be overloaded prior to the public service transmission, or may be created by virtue of the transmission of the public service transmission simultaneous to other AM signals on the same frequency (intentionally or unintentionally).

In any case, selective isolation of a given cochannel AM signal from other cochannel AM signals that have been received and separated from RF data received in an overloaded signal environment may be performed in response to a command specifying the identity of the given one of the cochannel AM signals. Such a command may originate, for example, from any source suitable for selectably choosing a given cochannel AM signal for isolation, e.g., a human user choosing a desired cochannel broadcast for listening, a computer processor choosing a selected cochannel broadcast needed for performing a specific task at hand, etc.

In one respect, disclosed herein is a method for processing AM signals that includes: receiving RF data in an overloaded signal environment, the received RF data including cochannel AM signals received in the same frequency range and at the same time; and separating each of the cochannel AM signals from other cochannel AM signals of the received RF data.

In another respect, disclosed herein is a method for transmitting AM signals that includes providing RF data including cochannel AM signals for transmission in the same frequency range and at the same time for reception by a receiver operating in an overloaded signal environment, the receiver configured to separate each of the cochannel AM signals from other cochannel AM signals of the RF data.

In another respect, disclosed herein is a system for communication using an overloaded signal environment. The system may include: transmit circuitry configured to provide RF data including cochannel AM signals for transmission in the same frequency range and at the same time; and receive and separation circuitry configured to receive and separate each of the cochannel AM signals from other cochannel AM signals of the RF data.

In another respect, disclosed herein is a method for processing AM signals, that includes receiving RF data that includes cochannel AM signals. The method may include separating each of the cochannel AM signals from other cochannel AM signals of the received RF data by: i) providing an initial estimate of (S) of the cochannel AM signals and an initial estimate of (a) representing amplitudes and phases of the cochannel AM signals; ii) providing at least one additional improved estimate of $(\hat{S}^{(k)})$ of the cochannel AM signals based at least in part on a most recent previous estimate $(\hat{S}^{(k-1)})$ of the cochannel AM signals, a most recent previous estimate of (a) representing amplitudes and phases of the cochannel AM signals, and the received RF data (r); and iii) repeating step ii) until a specified termination criteria is satisfied.

In another respect, disclosed herein is an AM signal processing system that includes receive and separation circuitry coupled to receive RF data from at least one sensor operating in an overloaded signal environment, the received RF data including cochannel AM signals received in the same frequency range and at the same time. The receive and separation circuitry may be configured to separate each of the cochannel AM signals from other cochannel AM signals of the received RF data.

In another respect, disclosed herein is an AM signal processing system that includes receive and separation circuitry coupled to receive RF data from a single sensor operating in an overloaded signal environment, the received RF data including cochannel AM signals. The receive and separation circuitry may be configured to separate each of the cochannel AM signals from other cochannel AM signals of the received RF data by: i) providing an initial estimate of (S) of the cochannel AM signals and an initial estimate of (a) representing amplitudes and phases of the cochannel AM signals; ii) providing at least one additional improved estimate of $(\hat{S}^{(k)})$ of the cochannel AM signals based at least in part on a most recent previous estimate $(\hat{S}^{(k-1)})$ of the cochannel AM signals, a most recent previous estimate of (a) representing amplitudes and phases of the cochannel AM signals, and received RF data (r); and iii) repeating step ii) until a specified termination criteria is satisfied.

BRIEF DESCRIPTION OF THE DRAWINGS

FIGS. 5-8 illustrate results of simulations performed according to the methodology of the disclosed methods and systems.

DESCRIPTION OF ILLUSTRATIVE EMBODIMENTS

Using the disclosed methods and systems, cochannel AM signals received from an overloaded signal environment may be separated from each other. In this regard, the disclosed methods and systems may be implemented in one embodiment by modeling a cochannel signal environment to facilitate separation of cochannel AM signals in an overloaded signal environment. For example, for purposes of illustration, a single sensor receiver may observe m temporal samples of n independent AM modulated sources transmitting in a common frequency band. In one embodiment of the disclosed methods and systems, this single sensor situation may be represented by a uniformly sampled complex baseband received signal model of the form where received data (r) is equal to the signal matrix (S) multiplied by the complex vector (a), plus complex noise (n):

$$r = Sa + n \qquad \text{(Equation 1)}$$

where $r \in C^m$, $S \in R^{m \times n}$, $a \in C^n$, $n \in C^m$. In the model of equation 1, the columns of S represent temporally sampled waveforms for each source. The elements of a are complex scalars representing the amplitude and phase of each source, and n is a complex noise vector. Using the received signal model of equation 1, the disclosed methods and systems may be implemented in one embodiment to determine or estimate S given r. After successful estimation of S, each column of the estimated S may be passed through a conventional AM demodulator to extract the message.

Figure 1:
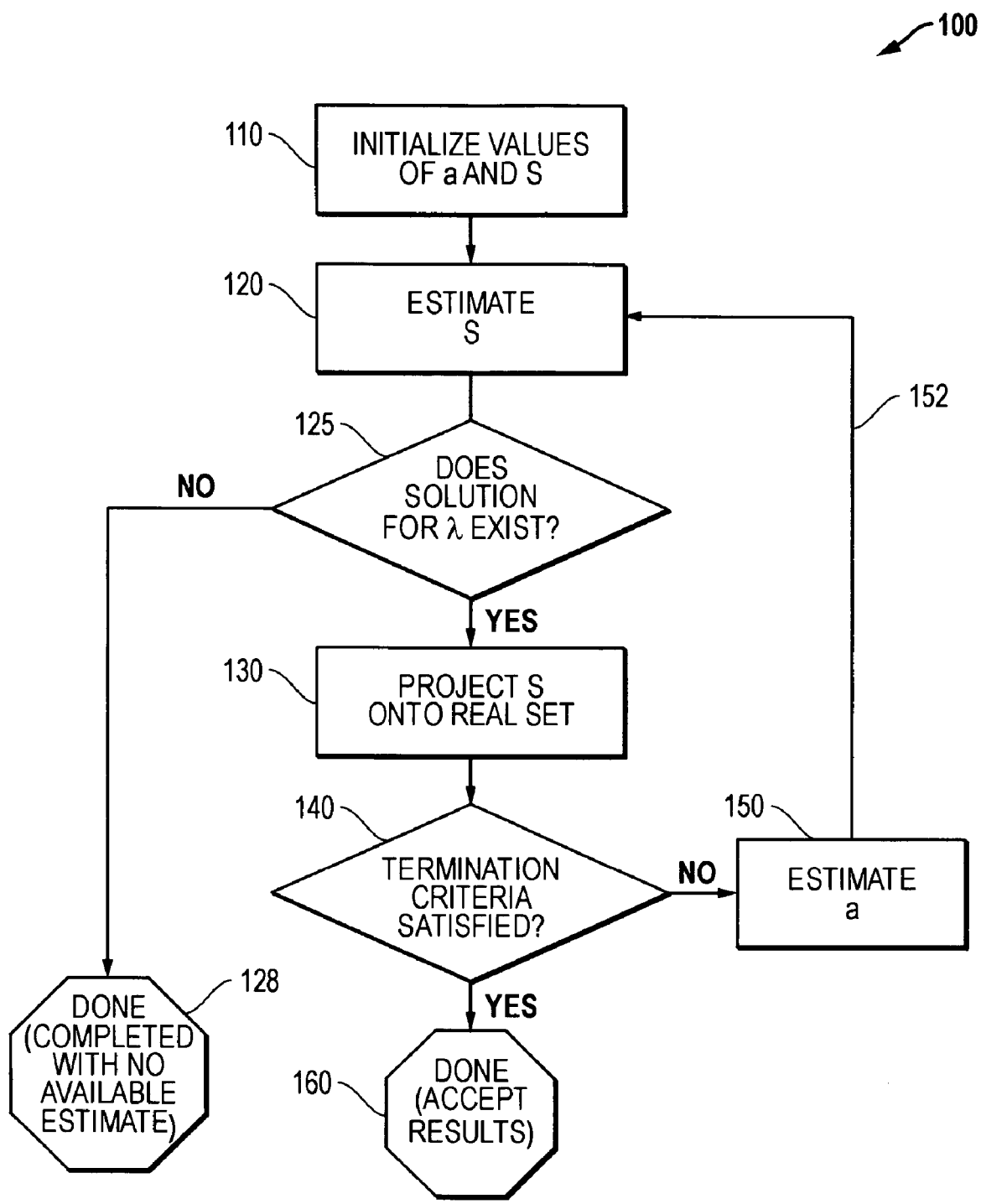
FIG. 1 illustrates methodology according to one exemplary embodiment of the disclosed methods and systems.

FIG. 1 illustrates exemplary methodology 100 that may be employed using the relationship of Equation 1 to separate cochannel AM signals in an overloaded signal environment according to one exemplary embodiment of the disclosed methods and systems. As illustrated in FIG. 1, values of a and S may be initialized in step 110. As will be further described with respect to the simulations described herein, each of a and S may be initialized in step 110 as random values, although it is also possible that a may be initialized with any other suitable type of value.

In step 120 of FIG. 1, the estimate of S may be improved using the most recent previous estimates of a and S. By an improved estimate of S, it is meant that the most recent estimate of S more closely approximates the true value of S than a previous estimate of S. In this regard, S may be estimated the first time in step 120 using the initialized values of a and S from step 110, and thereafter, as may be necessary, using the most recent previous estimated values of a and S as described further below. In step 130 of FIG. 1, the estimate of S from step 120 may be constrained to be real. The results of step 130 (plus other results such as the previous estimate of S or possibly the current estimate of a) may then be evaluated against one or more selected termination criteria in step 140. If the termination criteria has been met, then the results may be accepted in step 160 as shown. However, if the termination criteria has not been met, a new value of a may be estimated in step 150 using the previous estimate of S obtained from step 130. Step 120 may then be repeated as represented by iterative flow path 152, this time using the most recent previous estimate of a from step 150 and the most recent previous estimate of S from step 130. Using this methodology, steps 120 to 150 may be iteratively repeated until one or more selected termination criteria are satisfied in step 140, and the results accepted in step 160.

Referring now to FIG. 1 in more detail, a value for S may be estimated in step 120 of FIG. 1 using the most recent previous estimate of a and the previous estimate for S. Since Sa=r has infinite solutions for S, constraints may be imposed to reduce the solution space for S. For example, in one embodiment the solution space for S may be reduced by only considering solutions that are relatively "close" to the most recent previous estimate of S, denoted as $\hat{S}^{(k-1)}$, along with imposing a residual constraint. In this regard, the term "close" refers to the distance metric in the Frobenius norm sense, where this distance is calculated by taking the Frobenius norm of the difference between the current estimate, $\hat{S}^{(k)}$, and the previous estimate, $\hat{S}^{(k-1)}$. The Frobenius norm is defined as, $$\|A\|_F = \sqrt{\sum_{i=1}^{m} \sum_{j=1}^{n} |a_{ij}|^2},$$

where $A \in C^{m \times n}$.

In one exemplary embodiment, a constrained optimization problem may be expressed as the minimization of the trace of $\{E^H E\}$ as follows $$\min_E tr\{E^H E\} \quad \text{(Equation 2)}$$

$$\text{subject to } \left\| r - \left( E + \hat{S}^{(k-1)} \right) a \right\|^2 = \delta$$

where E is defined as follows $$E = \hat{S}^{(k)} - \hat{S}^{(k-1)}, \quad \text{(Equation 3)}$$

where $\hat{S}^{(k)}$ is the current estimate of S that minimizes the objective function and satisfies the constraint, where $\delta$ is the constraint bound, and where $tr\{\bullet\}$ is the trace operator. (Note: $\|E\|_F^2 = tr\{E^H E\}$.)

The constraint bound, $\delta$, is a parameter that may be used to define the squared length of the residual during the estimation of S, i.e., it may be used to represent the allowable amount of mismatch between the estimates and the observed data. Any suitable constraint bound methodology may be employed in the practice of the disclosed methods and systems. For example, a constraint bound value of 0 leads to a least-squares residual constraint. A constraint bound value may also be selected that is proportional to noise power, e.g., where an estimate of noise power is available. Another possible approach to setting a constraint bound value is to use a methodology that is purely heuristic.

The constrained optimization problem of Equation 2 may be solved using any suitable methodology. Further information on similar solution methodology may be found, for example, in Joel H. Trussel and Mehmet R. Civanlar, *The Feasible Solution in Signal Restoration*, IEEE Transactions on Acoustics, Speech and Signal Processing, Vol. ASSP-32, No. 2, April 1984, pp. 201-212, which is incorporated herein by reference.

The optimization problem of Equation 2 may be solved in one exemplary embodiment using Lagrangian techniques. In this case, the Lagrangian may be expressed as $$L(E,\lambda) = tr\{E^H E\} + \lambda\{[r-(E+\hat{S}^{(k-1)})a]^H \\ [r-(E+\hat{S}^{(k-1)})a] - \delta\} \quad \text{(Equation 4)}$$

The gradient of the Lagrangian is $$\nabla_E L(E,\lambda) = E + \lambda[(E+\hat{S}^{(k-1)})aa^H - ra^H] \quad \text{(Equation 5)}$$

Finding the roots, with respect to E, of the gradient of the Lagrangian, $\nabla_E L(E,\lambda) = 0$, results in the following expression for E, $$E = \left( r - \hat{S}^{(k-1)} a \right) a^H \left( aa^H + \frac{1}{\lambda} I \right)^{-1}. \quad \text{(Equation 6)}$$

In step 125, the Lagrange multiplier, $\lambda$, may be calculated using the solution for E above and the constraint equation. The expression for the Lagrange multiplier may be expressed as below, $$f(\lambda) = \left( r - \hat{S}^{(k-1)} a \right)^H \left( r - \hat{S}^{(k-1)} a \right) \quad \text{(Equation 7)}$$

$$\left[ 1 - a^H \left( aa^H + \frac{1}{\lambda} I \right)^{-1} a \right]^2 - \delta.$$

A range for the Lagrange multiplier solution may be defined as desired and an attempt to calculate the solution in the specified range may be made in step 125. If this attempt to calculate a solution fails, then the method may be terminated at step 128 with no available estimate. Alternatively, one or more successively wider ranges for the Lagrange multiplier solution may be specified, and one or more subsequent attempts made to calculate the solution in the specified successive ranges may be made in step 125 until a solution is found, or until the method has been performed for all specified successive ranges without finding a solution, at which point the method may be terminated at step 128. In determining the root in Eq. 7, the range and resolution specified for the bracketed range where the root is assumed to exist influences the speed of the iteration.

Once the roots of f(λ) are obtained, the correct root may be chosen based on which root minimizes the objective function, tr{$E^H E$}. This root may be used in Eq. 6 to calculate the projection, E, which may then be used to calculate $\hat{S}^{(k)}$ in step 120.

In step 130, the imaginary portion of $\hat{S}^{(k)}$ may be discarded and the real part of $\hat{S}^{(k)}$ taken to be the current estimate of S at the end of the $k^{th}$ iteration of the algorithm, i.e., when the model defines the temporal samples of each source to be real.

Following step 130, the current estimate of S may be evaluated against one or more termination criteria in step 140. In this regard, suitable termination criteria may include any one or more specified criteria that may be used at step 140 to determine whether or not the results of step 130 should be accepted. In one embodiment, termination criteria may include a specific number of iterations (e.g., iterations of steps 120 to 150) that have been performed. For example, steps 120 to 150 may iteratively performed for a specified given number of iterations, without consideration of other termination criteria. Alternatively, a maximum number of iterations may be specified for terminating the iterations of steps 120 to 150 when the specified maximum number of iterations have been performed, e.g., when other specified termination criteria has not yet been met. Also possible is a specified minimum number of iterations that must be performed prior to allowing termination of the iterations of steps 120 to 150 based on fulfillment of other specified termination criteria. Other examples of termination criteria that may be employed alone or in combination with other specified termination criteria include, but are not limited to, requiring a threshold minimum value for length of residual obtained in step 120 (i.e., terminating the iterations when the length of the residual is less than the specified threshold value), terminating the iterations of steps 120 to 150 when the Lagrange multiplier function (Equation 7) of step 120 has no solution over the specified range for which the function is being evaluated, etc. It will be understood that the foregoing example of termination criteria are exemplary only, and that other criteria may be additionally or alternatively employed in step 140.

If the specified termination criteria is satisfied in step 140, then the steps of method 100 may be concluded, and the results accepted in step 160. However, if the termination criteria is not satisfied in step 140, method 100 may proceed to step 150 where a new value of a may be estimated using any suitable method and, for example, using at least a portion of the results previously determined in preceding steps 120 to 130. In one embodiment, the elements of a may be jointly estimated in step 150 using a least-squares estimation approach. For example, a new value of a may be calculated as described below using r and the most recent previous estimate of S obtained in step 130.

In one exemplary embodiment, a least-squares problem may be expressed for step 150 as an optimization problem with an objective function equal to the squared norm of the residual, $$J(a) = \|r - Sa\|^2. \quad \text{(Equation 8)}$$

Thus, the optimization problem is $$\min_a J(a).$$

The minimum may be found by finding the root of the gradient of the objective function, $$\arg \nabla_{a^*} J(a) = 0.$$

Equating the gradient equal to 0 yields the following expression, $$\nabla_{a^*} J(a) = S^H S a - S^H r = 0 \quad \text{(Equation 9)}$$

Therefore, for this exemplary embodiment, the estimate for a in step 150 may be expressed as $$\hat{a} = (S^H S)^{-1} S^H r. \quad \text{(Equation 10)}$$

The solution may be verified as a minimum by verifying that the Hessian of the objective function is positive definite, $$\nabla_a^2 = \nabla_a \nabla_{a^*} J(a) = S^H S > 0 \quad \text{(Equation 11)}$$

In this case, $S^H S$ is positive definite by construction, so the solution is verified as a minimum.

Once a has been so estimated in step 150, method 100 may proceed via iterative flow path 152 to step 120, where a new value of S may be estimated using the most recent previous estimate of a from step 150 and the most recent previous estimate of S from step 130 in a manner as previously described. Steps 130 through 140 may then be repeated and method 100 terminated if termination criteria is satisfied in step 140, or step 150 may be repeated if termination criteria is not satisfied in step 140. In this manner, steps 150, 120, 125, 130 and 140 may be iteratively repeated until the termination criteria is satisfied in step 140, and the method moves to step 160.

Although described herein with respect to a single sensor receiver, it will be understood that the methodology of the disclosed methods and systems may be implemented using more than one sensor for separation of cochannel AM signals in overloaded signal environments.

Figure 2:
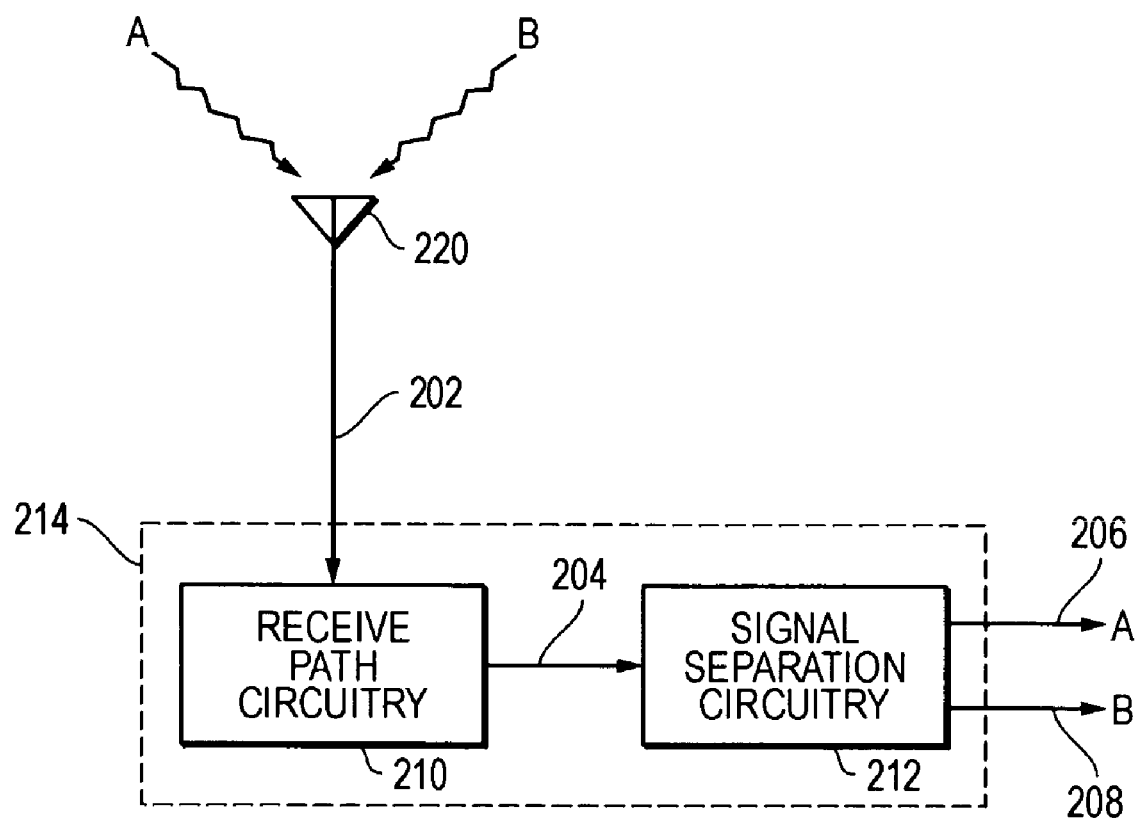
FIG. 2 illustrates a system according to one exemplary embodiment of the disclosed methods and systems.

The disclosed methods and systems may be implemented, for example, as part of a receiver or transceiver in any manner suitable for achieving the cochannel signal separation results described elsewhere herein. FIG. 2 illustrates one exemplary embodiment of a system 200 as it may be implemented to receive and to separate cochannel AM signals A and B in an overloaded signal environment. As illustrated in FIG. 2, system 200 includes a single sensor in the form of single antenna 220 that is coupled to receive and separation circuitry 214 that, in this exemplary embodiment, includes receive path circuitry 210 coupled to signal separation circuitry 212, it being understood that any other configuration of receive and separation circuitry may be employed that is suitable for performing one or more of the signal separation tasks described elsewhere herein.

System 200 is illustrated configured as a receive-only system in FIG. 2. However, it will be understood that in other embodiments the disclosed methods and systems may be alternatively implemented in a system configured as a transceiver. In addition, it is possible that more than one antenna 220 may be coupled to receive and separation circuitry 214, and/or that antenna 220 may be a single element antenna or an antenna array. It will also be understood that in other embodiments an overloaded signal environment may include more than two cochannel signals.

As illustrated in FIG. 2, antenna 220 is coupled to provide a RF data 202 that contains a combination of multiple received AM signals A and B to receive path circuitry 210. Receive path circuitry 210 (e.g., single channel tuner or other suitable circuitry) is configured to process or condition the received RF data 202 from antenna 220 so as to provide processed signal 204 (e.g., as a single tuned channel), that contains combined multiple signals A and B, to signal separation circuitry 212 (e.g., implemented as part of a digital signal processor or with other suitable circuitry). Signal separation circuitry 212 is configured to receive processed signal 204 from receive path circuitry 210 and to separate multiple signals A and B. As shown, signal separation circuitry 212 is configured to provide multiple differentiated signals A and B (e.g., as respective separate signals 206 and/or 208) to other receiver system components not shown (e.g., components/circuitry for further processing, AM demodulation, etc.). It will be understood that separate signals 206 and 208 may be provided simultaneously by signal separation circuitry 212, or that only one of differentiated signals 206 or 208 may be preferentially or selectably provided by signal separation circuitry 212.

In the practice of the disclosed methods and systems signal separation circuitry, such as circuitry 212 of FIG. 2, may be implemented using any circuit configuration or combination of circuit configurations suitable for separating two or more combined cochannel AM signals, e.g., received from one or more sensor/s deployed in an overloaded signal environment. For example, in one embodiment signal separation circuitry may be configured in any manner suitable for achieving separation of cochannel AM signals in an overloaded environment using data obtained from one or more sensors through a method of iterative projections, e.g., using methodology such as described in relation to FIG. 1 herein. In one embodiment, signal separation circuitry 212 of FIG. 2 may be implemented as a digital-signal processor (DSP). Alternatively, or in addition to a DSP, signal separation circuitry 212 may be implemented using any other type/s of suitable signal processor/s.

It will be understood that the illustrated embodiment of FIG. 2 is exemplary only, and that any other configuration of circuitry and/or sensor/s suitable for accomplishing signal separation according to the methodology disclosed herein is possible. It will also be understood that although FIG. 2 illustrates separation of two cochannel AM signals from an overloaded signal environment, the disclosed methods and systems may be implemented in overloaded signal environments that include three or more cochannel AM signals. In FIG. 2, signal separation circuitry 212 is shown configured to separate cochannel AM signals A and B and to provide these as separate output signals 206 and 208. However, it will be understood that signal separation circuitry may be configured in other embodiments to separate out only one cochannel AM signal received from an overloaded signal environment including two or more cochannel signals, e.g., to separate only AM signal A or signal B from the overloaded signal environment of FIG. 2. In this regard, an overloaded signal environment may include any given total number of cochannel AM signals, and the disclosed methods and systems may be implemented in one embodiment to separate out any number of the cochannel AM signals that is equal to or less than the total number of cochannel AM signals, as may be desired or required to meet the needs of a given application. In one exemplary embodiment, the given total number of cochannel AM signals may be characterized as a number of cochannel AM signals having a received signal strength greater than a given signal strength threshold.

Simulation Results

Following are results of simulations that have been performed by implementing equations 1-11 in combination with the disclosed methodology 100 of FIG. 1 for the estimation of AM signals (S) in an overloaded signal environment. The overloaded signal embodiment employed for each of the four simulations included one sensor and two cochannel AM signals. The two cochannel signals for each simulation included one relatively strong cochannel signal (S1) and one relatively weak cochannel signal (S2), although it will be understood that the disclosed methods and systems may be implemented in overloaded signal environments having two or more AM cochannel signals of equivalent strength.

As described further below, four simulations were performed using random initial estimates for S, while varying the initial estimate for a. In the first simulation, a was initialized to the known true initial phases of the signals. In the second simulation, a was initialized using random initial phases for the signals. In the third simulation, a was estimated using known incorrect initial phases for the signals. The fourth simulation was performed using correct initial phases, but including a frequency offset to simulate Doppler frequency shift on the strong signal (S1). The results of the simulations show that the disclosed methodology successfully achieves signal separation under the described conditions with known, random or incorrect phase initialization. Thus, the simulations illustrate how the disclosed methodology may be advantageously implemented to successfully achieve signal separation even when initial phases are unknown.

It has been seen in some simulations that initializing with incorrect phases under certain conditions may provide better signal separation than using random phase initialization. It has been observed that times for which this occurs tend to be when the phase of the random values for each component of a are associated with a small angular separation.

Signal Environment and Signal Generation Parameters for Simulations

Following is a list of signal parameters employed for the simulations described herein.

Simulated Messages: Simulations were performed with simulated data where the messages were constructed by sampling a uniform random distribution. Simulations were also performed using recorded voice data as the messages. In either case, the messages were AM modulated, and zero mean additive white complex Gaussian noise was added.

Bandwidth Constrained Messages: It has been found that constraining the message bandwidth to a fraction of the transmission bandwidth may improve separation performance.

SNR (Signal to Noise Ratio): SNRs for each of the AM signals were set to 20 dB and 15 dB.

Initial phase: The initial phases for the two signals were 30° and 100°.

AM Modulation Index: The modulation index for the simulations was set to 0.5, where modulation index is defined as the ratio of the negative of the minimum value of the message divided by the amplitude of the carrier.

Block Size: Block size or number of samples per processing period was set to 1024 for most cases.

Doppler Frequency: Unless indicated to the contrary, the Doppler frequency has been set to 0.

Algorithm Parameter Values for Simulations

Figure 3:
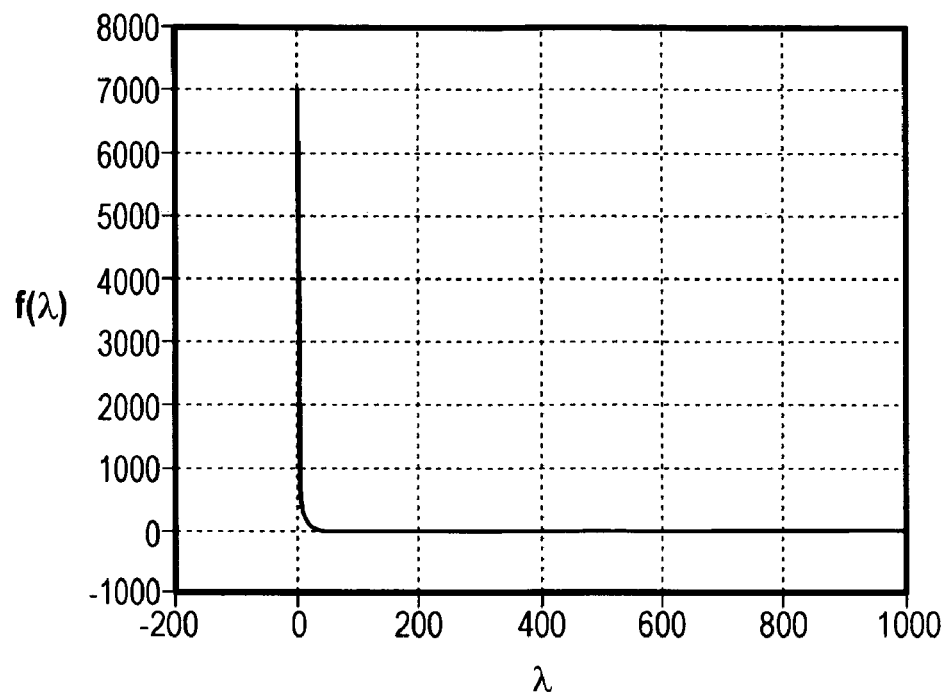
FIG. 3 illustrates a plot of f(λ) according to one exemplary embodiment of the disclosed methods and systems.
Figure 4:
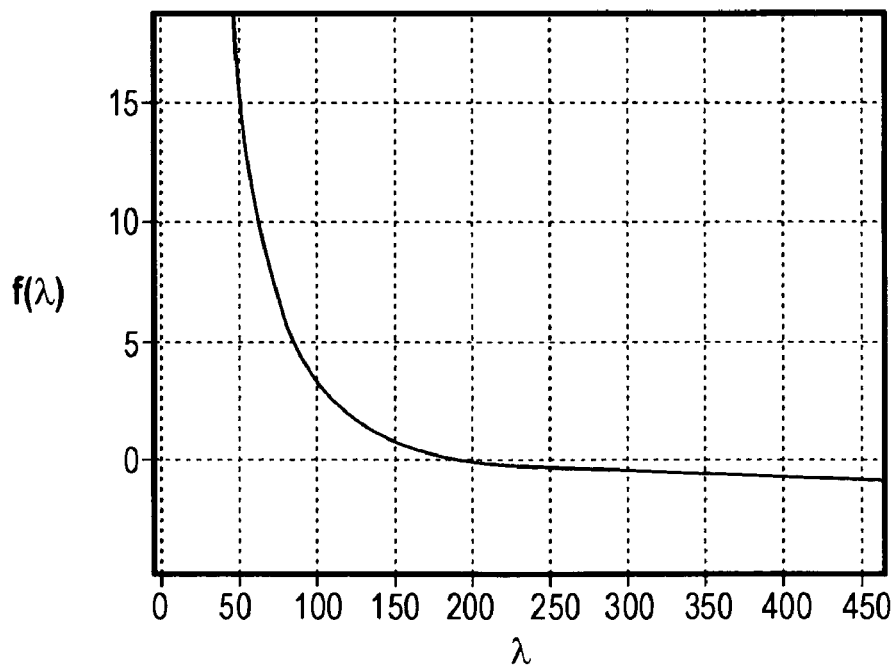
FIG. 4 illustrates a plot of f(λ) according to one exemplary embodiment of the disclosed methods and systems.

The following simulations were carried out using signal environments consisting of two cochannel AM signals plus noise. Therefore, the signal model dimension parameter (n) described in relation to Equation 1 was set to 2. For the simulations, the constraint bound ($\delta$) has been set to a value of 1, which, in this case, is a heuristic value chosen to provide a solution for S that corresponds to a unit norm residual constraint. In comparison, choosing a constraint bound value ($\delta$) of zero would result in a large range of values needed to search over when finding the roots for the Lagrange multiplier, $\lambda$, in Equation 7. As may be seen in Equation 7, the value of the constraint bound ($\delta$) acts as a parameter that shifts the overall function up or down. In this regard, when either the length of the residual becomes small, or the constraint bound ($\delta$) is a small value, the root approaches very large values. FIG. 3 is a plot of $f(\lambda)$ for a particular set of data when the constraint bound ($\delta$) is set to 1. FIG. 4 is the same plot zoomed into the range of the plot of FIG. 1 where the root occurs.

In the following simulations, the range and resolution defining the bracketed range for locating the root for $\lambda$ were [−3, 1000] and 5.0, respectively. The selected termination criteria used in the simulations was a combination of a maximum number of six iterations, and a test for the existence of a root for the Lagrange multiplier, $\lambda$, in Eq. 7 over the specified range. In this exemplary implementation, the predefined maximum number of iterations was chosen to act as an upper bound for the maximum number of iterations allowed, and the test for the existence of a root for the Lagrange multiplier, $\lambda$, was employed to allow the algorithm to terminate or exit earlier when the length of the residual becomes small.

Simulation Performance

The performances of four simulation cases are presented in the form of amplitude versus time plots of the true and estimated signals, with their respective phases, passed through a simple AM demodulator. All of the following simulations use the parameter values described above unless otherwise noted. Also, only a small number of samples were plotted in each plot so that the tracking of the estimated signal relative to the true signal may be easily seen.

FIG. 5 illustrates the results of Simulation 1, which was carried out using correct initial phases. FIG. 6 illustrates the results of Simulation 2, which was carried out using random initial phases. FIG. 7 illustrates the results of Simulation 3, which was carried out using incorrect initial phases of 0° and 90°. FIG. 8 illustrates the results of Simulation 4, which was carried out using correct initial phases, but also including a frequency offset to simulate a Doppler frequency shift of 50 Hz on the 20 dB signal at 30° and no Doppler frequency shift on the weaker signal at 100°.

Each of the four simulations of FIGS. 5-8 illustrate implementation of the disclosed methods and systems to separate and estimate both stronger (S1) and weaker (S2) AM cochannel signals. The first three simulations assumed coherent tuning for both signals. FIG. 8 illustrates an implementation of the disclosed methods and systems in an overloaded signal environment having a weaker signal with no Doppler shift (coherently tuned) in combination with a stronger signal (having a small Doppler shift). For this simulation, the block size was reduced from 1024 samples to 32 samples with a sampling rate of 10 kHz. In one exemplary embodiment, the ratio of Doppler frequency to sampling rate may be used to determine how much phase change exists from sample to sample and to determine performance of the disclosed methods and systems.

With respect to the simulations described herein, it was noted that the final estimate of a may not converge to the true a. In this regard, it may be reasonable to assume that each component of a may be slightly perturbed from the true value, since a constraint bound of 1 ignores almost all of the noise power. Cases where the phase is initialized to incorrect phases of 0° and 90° may result in estimates that converge to incorrect phases of around 6° and 84°. Even with convergence to incorrect phases, results show that each signal may be estimated. A decreasing residual with each iteration implies that the estimates of S and a "fit" the data more and more with each iteration. It will be understood that the disclosed methods and systems may be further implemented in other exemplary embodiments with incorporation of Doppler shifts and miss tuning offsets to enhance performance for particular signal environments.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

What is claimed is:

1. A method for processing AM signals, comprising:
   receiving RF data in an overloaded signal environment, said received RF data comprising cochannel AM signals received in the same frequency range and at the same time; and
   separating each of said cochannel AM signals from other cochannel AM signals of said received RF data;
   wherein said separating comprises estimating each of said cochannel AM signals based on said received RF data; and
   wherein said separating further comprises:
      providing an initial estimate for each of said cochannel AM signals;
      providing a first improved estimate for each of said cochannel AM signals based at least in part on said initial estimates for each of said cochannel AM signals and said received RF data; and
      providing a second improved estimate for each of said cochannel AM signals based at least in part on said first improved estimates for each of said cochannel AM signals and said received RF data.

2. The method of claim 1, wherein said cochannel AM signals are transmitted from geographically remote locations; and wherein said method further comprises receiving said RF data comprising said cochannel AM signals transmitted from geographically remote locations.

3. A method for processing AM signals, comprising:
  receiving RF data in an overloaded signal environment, said received RF data comprising cochannel AM signals received in the same frequency range and at the same time; and
  separating each of said cochannel AM signals from other cochannel AM signals of said received RF data;
  wherein said separating comprises estimating each of said cochannel AM signals based on said received RF data; and
  wherein said separating further comprises:
  i) providing an initial estimate for each of said cochannel AM signals; and
  ii) providing at least one additional improved estimate for each of said cochannel AM signals based at least in part on a most recent previous estimates for each of said cochannel AM signals and said received RF data.

4. The method of claim 3, further comprising repeating step ii) until a specified termination criteria is satisfied.

5. The method of claim 3, wherein said RF data is received by a single sensor; wherein said step i) comprises providing an initial estimate of (S) of said cochannel AM signals and an initial estimate of (a) representing amplitudes and phases of said cochannel AM signals; and wherein said step ii) comprises providing an improved estimate ($\hat{S}^{(k)}$) of said cochannel AM signals based at least in part on a most recent previous estimate ($\hat{S}^{(k-1)}$) of said cochannel AM signals, a most recent previous estimate of (a) representing amplitudes and phases of said cochannel AM signals, and said received RF data (r).

6. The method of claim 5, wherein said step ii) comprises providing an additional estimate ($\hat{S}^{(k)}$) of said cochannel AM signals that minimizes the objective function tr$\{E^H E\}$ and satisfies the constraint bound ($\delta$) according to the following relationship:

$$\min_{E} tr\{E^H E\}$$
$$\text{subject to } \left\| r - \left(E + \hat{S}^{(k-1)}\right) a \right\|^2 = \delta$$
$$\text{where } E = \hat{S}^{(k)} - \hat{S}^{(k-1)};$$

7. The method of claim 3, wherein said overloaded signal environment is created by intentionally broadcasting said cochannel AM signals simultaneously in the same frequency range.

8. The method of claim 7, wherein one of said cochannel AM signals comprises public service information; and wherein said method further comprises isolating said AM signal comprising said public service information from other cochannel AM signals of said received RF data.

9. The method of claim 7, wherein said method further comprises selectively isolating a given one of said cochannel AM signals from other cochannel AM signals of said received RF data in response to a command specifying the identity of said given one of said cochannel AM signals.

10. The method of claim 3, wherein said cochannel AM signals are transmitted from geographically remote locations; and wherein said method further comprises receiving said RF data comprising said cochannel AM signals transmitted from geographically remote locations.

11. A method for transmitting AM signals, comprising providing RF data comprising cochannel AM signals for transmission in the same frequency range and at the same time for reception by a receiver operating in an overloaded signal environment; and providing a receiver configured to separate each of said cochannel AM signals from other cochannel AM signals of said RF data; said receiver comprising:
  receive and separation circuitry coupled to receive RF data from at least one sensor operating in an overloaded signal environment, said received RF data comprising cochannel AM signals received in the same frequency range and at the same time; and
  wherein said receive and separation circuitry is configured to separate each of said cochannel AM signals from other cochannel AM signals of said received RF data;
  wherein said receive and separation circuitry is configured to separate each of said cochannel AM signals from said other cochannel AM signals by estimating each of said cochannel AM signals based on said received RF data; and
  wherein said receive and separation circuitry is further configured to;
  i) provide an initial estimate for each of said cochannel AM signals; and
  ii) provide at least one additional improved estimate for each of said cochannel AM signals based at least in part on a most recent previous estimates for each of said cochannel AM signals and said received RF data.

12. The method of claim 11, wherein one of said cochannel AM signals comprises public service information; and wherein said receiver is further configured to isolate said AM signal comprising said public service information from other cochannel AM signals of said received RF data.

13. The method of claim 11, wherein said receiver is further configured to selectively isolate a given one of said cochannel AM signals from other cochannel AM signals of said received RF data in response to a command specifying the identity of said given one of said cochannel AM signals.

14. The method of claim 11, wherein said method further comprises:
  receiving said RF data in an overloaded signal environment, said received RF data comprising said cochannel AM signals received in the same frequency range and at the same time; and
  separating each of said cochannel AM signals from other cochannel AM signals of said received RF data:
  wherein said separating comprises estimating each of said cochannel AM signals based on said received RF data; and
  wherein said separating further comprises:
  i) providing an initial estimate for each of said cochannel AM signals; and
  ii) providing at least one additional improved estimate for each of said cochannel AM signals based at least in part on a most recent previous estimates for each of said cochannel AM signals and said received RF data.

15. The method of claim 11, further comprising transmitting said cochannel AM signals from geographically remote locations.

16. A system for communication using an overloaded signal environment, said system comprising:
  transmit circuitry configured to provide RF data comprising cochannel AM signals for transmission in the same frequency range and at the same time; and
  receive and separation circuitry configured to receive and separate each of said cochannel AM signals from other cochannel AM signals of said RF data, said receive and separation circuitry coupled to receive RF data from at least one sensor operating in an overloaded signal environment, said received RF data comprising cochannel AM signals received in the same frequency range and at the same time; and wherein said receive and separation circuitry is configured to separate each of said cochannel AM signals from other cochannel AM signals of said received RF data;

wherein said receive and separation circuitry is configured to separate each of said cochannel AM signals from said other cochannel AM signals by estimating each of said cochannel AM signals based on said received RF data; and wherein said receive and separation circuitry is further configured to;

i) provide an initial estimate for each of said cochannel AM signals; and ii) provide at least one additional improved estimate for each of said cochannel AM signals based at least in part on a most recent previous estimates for each of said cochannel AM signals and said received RF data.

17. A method for processing AM signals, comprising:

receiving RF data, said received RF data comprising cochannel AM signals; and separating each of said cochannel AM signals from other cochannel AM signals of said received RF data by:

i) providing an initial estimate of (S) of said cochannel AM signals and an initial estimate of (a) representing amplitudes and phases of said cochannel AM signals, ii) providing at least one additional improved estimate of ($\hat{S}^{(k)}$) of said cochannel AM signals based at least in part on a most recent previous estimate ($\hat{S}^{(k-1)}$) of said cochannel AM signals, a most recent previous estimate of (a) representing amplitudes and phases of said cochannel AM signals, and said received RF data (r), and iii) repeating step ii) until a specified termination criteria is satisfied.

18. The method of claim 17, wherein said step ii) comprises providing an additional estimate ($\hat{S}^{(k)}$) of said cochannel AM signals that minimizes the objective function tr{$E^H E$} and satisfies the constraint bound ($\delta$) according to the following relationship:

$$\min_E tr\{E^H E\}$$
$$\text{subject to } \left\| r - \left(E + \hat{S}^{(k-1)}\right) a \right\|^2 = \delta$$
$$\text{where } E = \hat{S}^{(k)} - \hat{S}^{(k-1)};$$

19. The method of claim 18, wherein said step ii) further comprises minimizing the objective function tr{$E^H E$} and satisfying the constraint bound ($\delta$) by:

a) forming the Lagrangian:

$$\min_E tr\{E^H E\}$$
$$\text{subject to } \left\| r - \left(E + \hat{S}^{(k-1)}\right) a \right\|^2 = \delta$$
$$\text{where } E = \hat{S}^{(k)} - \hat{S}^{(k-1)};$$

b) then calculating the gradient of the Lagrangian:

$$f(\lambda) = \left(r - \hat{S}^{(k-1)} a\right)^H \left(r - \hat{S}^{(k-1)} a\right)\left[1 - a^H\left(aa^H + \frac{1}{\lambda}I\right)^{-1} a\right]^2 - \delta;$$

c) then finding the roots of the gradient of the Lagrangian with respect to E);

d) finding the root of $f(\lambda)$ that minimizes the objective function objective function tr{EHE}, where:

$$f(\lambda) = \left(r - \hat{S}^{(k-1)} a\right)^H \left(r - \hat{S}^{(k-1)} a\right)\left[1 - a^H\left(aa^H + \frac{1}{\lambda}I\right)^{-1} a\right]^2 - \delta;$$

e) then calculating the projection (E) using the following relationship:

$$E = \left(r - \hat{S}^{(k-1)} a\right) a^H \left(aa^H + \frac{1}{\lambda}I\right)^{-1};$$

f) then calculating the estimate ($\hat{S}^{(k)}$) of said cochannel AM signals using the following relationship:

$$E = \hat{S}^{(k)} - \hat{S}^{(k-1)}; \text{ and}$$

g) then constraining ($\hat{S}^{(k)}$) to be real.

20. The method of claim 17, wherein said cochannel AM signals are transmitted from geographically remote locations; and wherein said method further comprises receiving said RF data comprising said cochannel AM signals transmitted from geographically remote locations.

21. An AM signal processing system, comprising:

receive and separation circuitry coupled to receive RF data from at least one sensor operating in an overloaded signal environment, said received RF data comprising cochannel AM signals received in the same frequency range and at the same time; and wherein said receive and separation circuitry is configured to separate each of said cochannel AM signals from other cochannel AM signals of said received RF data;

wherein said receive and separation circuitry is configured to separate each of said cochannel AM signals from said other cochannel AM signals by estimating each of said cochannel AM signals based on said received RF data; and wherein said receive and separation circuitry is further configured to:

provide an initial estimate for each of said cochannel AM signals;

provide a first improved estimate for each of said cochannel AM signals based at least in part on said initial estimates for each of said cochannel AM signals and said received RF data; and provide a second improved estimate for each of said cochannel AM signals based at least in part on said first improved estimates for each of said cochannel AM signals and said received RF data.

22. The system of claim 21, wherein said receive and separation circuitry is coupled to receive RF data comprising cochannel AM signals transmitted from geographically remote locations; and wherein said receive and separation circuitry is configured to separate each of said cochannel AM signals from other cochannel AM signals that are transmitted from geographically remote locations.

23. An AM signal processing system, comprising:

receive and separation circuitry coupled to receive RF data from at least one sensor operating in an overloaded signal environment, said received RF data comprising cochannel AM signals received in the same frequency range and at the same time; and wherein said receive and separation circuitry is configured to separate each of said cochannel AM signals from other cochannel AM signals of said received RF data;

wherein said receive and separation circuitry is configured to separate each of said cochannel AM signals from said other cochannel AM signals by estimating each of said cochannel AM signals based on said received RF data; and wherein said receive and separation circuitry is further configured to:

i) provide an initial estimate for each of said cochannel AM signals; and ii) provide at least one additional improved estimate for each of said cochannel AM signals based at least in part on a most recent previous estimates for each of said cochannel AM signals and said received RF data.

24. The system of claim 23, wherein said receive and separation circuitry is further configured to repeat said step ii) until a specified termination criteria is satisfied.

25. The system of claim 23, wherein said at least one sensor is a single sensor; and wherein said receive and separation circuitry is further configured to:

perform said step i) by providing an initial estimate of (S) of said cochannel AM signals and an initial estimate of (a) representing amplitudes and phases of said cochannel AM signals; and perform said step ii) by providing an improved estimate ($\hat{S}^{(k)}$) of said cochannel AM signals based at least in part on a most recent previous estimate ($\hat{S}^{(k-1)}$) of said cochannel AM signals, a most recent previous estimate of (a) representing amplitudes and phases of said cochannel AM signals, and said received RF data (r).

26. The system of claim 25, wherein said receive and separation circuitry is further configured to perform said step ii) by providing an additional estimate ($\hat{S}^{(k)}$) of said cochannel AM signals that minimizes the objective function $tr\{E^H E\}$ and satisfies the constraint bound ($\delta$) according to the following relationship:

$$\min_E tr\{E^H E\}$$

$$\text{subject to } \left\| r - \left(E + \hat{S}^{(k-1)}\right)a \right\|^2 = \delta$$

$$\text{where } E = \hat{S}^{(k)} - \hat{S}^{(k-1)};$$

27. The system of claim 23, wherein one of said cochannel AM signals comprises public service information; and wherein said receive and separation circuitry is further configured to isolate said AM signal comprising said public service information from other cochannel AM signals of said received RF data.

28. The system of claim 23, wherein said receive and separation circuitry is further configured to selectively isolate a given one of said cochannel AM signals from other cochannel AM signals of said received RF data in response to a command specifying the identity of said given one of said cochannel AM signals.

29. The system of claim 23, wherein said receive and separation circuitry is coupled to receive RF data comprising cochannel AM signals transmitted from geographically remote locations; and wherein said receive and separation circuitry is configured to separate each of said cochannel AM signals from other cochannel AM signals that are transmitted from geographically remote locations.

30. An AM signal processing system, comprising:

receive and separation circuitry coupled to receive RF data from a single sensor operating in an overloaded signal environment, said received RF data comprising cochannel AM signals; and wherein said receive and separation circuitry is configured to separate each of said cochannel AM signals from other cochannel AM signals of said received RF data by:

i) providing an initial estimate of (S) of said cochannel AM signals and an initial estimate of (a) representing amplitudes and phases of said cochannel AM signals, ii) providing at least one additional improved estimate of ($\hat{S}^{(k)}$) of said cochannel AM signals based at least in part on a most recent previous estimate ($\hat{S}^{(k-1)}$) of said cochannel AM signals, a most recent previous estimate of (a) representing amplitudes and phases of said cochannel AM signals, and received RF data (r), and iii) repeating step ii) until a specified termination criteria is satisfied.

31. The system of claim 30, wherein said receive and separation circuitry is further configured to perform step ii) by providing an additional estimate ($\hat{S}^{(k)}$) of said cochannel AM signals that minimizes the objective function $tr\{E^H E\}$ and satisfies the constraint bound ($\delta$) according to the following relationship:

$$\min_E tr\{E^H E\}$$

$$\text{subject to } \left\| r - \left(E + \hat{S}^{(k-1)}\right)a \right\|^2 = \delta$$

$$\text{where } E = \hat{S}^{(k)} - \hat{S}^{(k-1)};$$

32. The system of claim 30, wherein said receive and separation circuitry is further configured to perform step ii) by minimizing the objective function $tr\{E^H E\}$ and satisfying the constraint bound ($\delta$) by:

a) forming the Lagrangian:

$$L(E, \lambda) = tr\{E^H E\} + \lambda \left\{ \left[r - \left(E + \hat{S}^{(k-1)}\right)a\right]^H \left[r - \left(E + \hat{S}^{(k-1)}\right)a\right] - \delta \right\};$$

b) then calculating the gradient of the Lagrangian:

$$\nabla_E \cdot L(E, \lambda) = E + \lambda \left[ \left(E + \hat{S}^{(k-1)}\right) a a^H - r a^H \right];$$

c) then finding the roots of the gradient of the Lagrangian with respect to E;

d) finding the root of $f(\lambda)$ that minimizes the objective function objective function $tr\{E^H E\}$, where:

$$f(\lambda) = \left(r - \hat{S}^{(k-1)} a\right)^H \left(r - \hat{S}^{(k-1)} a\right) \left[1 - a^H \left(a a^H + \frac{1}{\lambda} I\right)^{-1} a\right]^2 - \delta;$$

e) then calculating the projection (E) using the following relationship:

$$E = \left(r - \hat{S}^{(k-1)} a\right) a^H \left(a a^H + \frac{1}{\lambda} I\right)^{-1};$$

f) then calculating the estimate ($\hat{S}^{(k)}$) of said cochannel AM signals using the following relationship:

$E = \hat{S}^{(k)} - \hat{S}^{(k-1)}$; and g) then constraining ($\hat{S}^{(k)}$) to be real.

33. The system of claim 30, wherein said receive and separation circuitry is coupled to receive RF data comprising cochannel AM signals transmitted from geographically remote locations; and wherein said receive and separation circuitry is configured to separate each of said cochannel AM signals from other cochannel AM signals that are transmitted from geographically remote locations.

* * * * *

UNITED STATES PATENT AND TRADEMARK OFFICE
CERTIFICATE OF CORRECTION

PATENT NO. : 7,233,777 B2
APPLICATION NO. : 10/930732
DATED : June 19, 2007
INVENTOR(S) : Colling It is certified that error appears in the above-identified patent and that said Letters Patent is hereby corrected as shown below:

In claim 19, column 15, lines 55-57, delete

" $\min_{\mathbf{E}} tr\{\mathbf{E}^H \mathbf{E}\}$ subject to $\left\| \mathbf{r} - \left( \mathbf{E} + \hat{\mathbf{S}}^{(k-1)} \right) \mathbf{a} \right\|^2 = \delta$ where $\mathbf{E} = \hat{\mathbf{S}}^{(k)} - \hat{\mathbf{S}}^{(k-1)}$ ."

And insert -- $L(\mathbf{E}, \lambda) = tr\{\mathbf{E}^H \mathbf{E}\} + \lambda \left\{ \left[ \mathbf{r} - \left( \mathbf{E} + \hat{\mathbf{S}}^{(k-1)} \right) \mathbf{a} \right]^H \left[ \mathbf{r} - \left( \mathbf{E} + \hat{\mathbf{S}}^{(k-1)} \right) \mathbf{a} \right] - \delta \right\}$ ; --

In claim 19, column 15, line 63, delete

" $f(\lambda) = \left( \mathbf{r} - \hat{\mathbf{S}}^{(k-1)} \mathbf{a} \right)^H \left( \mathbf{r} - \hat{\mathbf{S}}^{(k-1)} \mathbf{a} \right) \left[ 1 - \mathbf{a}^H \left( \mathbf{aa}^H + \frac{1}{\lambda} I \right)^{-1} \mathbf{a} \right]^2 - \delta$ ;"

And insert -- $\nabla_{\mathbf{E}^*} L(\mathbf{E}, \lambda) = \mathbf{E} + \lambda \left[ \left( \mathbf{E} + \hat{\mathbf{S}}^{(k-1)} \right) \mathbf{aa}^H - \mathbf{ra}^H \right]$ ; --

In claim 19, column 16, line 2, delete "objective function tr{EHE}" and insert -- $tr\{\mathbf{E}^H \mathbf{E}\}$ --

UNITED STATES PATENT AND TRADEMARK OFFICE
CERTIFICATE OF CORRECTION

PATENT NO. : 7,233,777 B2
APPLICATION NO. : 10/930732
DATED : June 19, 2007
INVENTOR(S) : Colling It is certified that error appears in the above-identified patent and that said Letters Patent is hereby corrected as shown below:

In claim 32, column 18, line 54, delete "objective function".

Signed and Sealed this

Seventh Day of August, 2007

JON W. DUDAS
*Director of the United States Patent and Trademark Office*